United States Patent
Malofsky et al.

(10) Patent No.: US 9,234,107 B2
(45) Date of Patent: Jan. 12, 2016

(54) INK COATING FORMULATIONS AND POLYMERIZABLE SYSTEMS FOR PRODUCING THE SAME

(71) Applicant: Sirrus, Inc., Loveland, OH (US)

(72) Inventors: Bernard M. Malofsky, Bloomfield, CT (US); Adam G. Malofsky, Loveland, OH (US); Matthew M. Ellison, Mason, OH (US)

(73) Assignee: Sirrus, Inc., Loveland, OH (US)

( * ) Notice: Subject to any disclaimer, the term of this patent is extended or adjusted under 35 U.S.C. 154(b) by 0 days.

(21) Appl. No.: 14/388,582

(22) PCT Filed: Mar. 29, 2013

(86) PCT No.: PCT/US2013/034649
§ 371 (c)(1),
(2) Date: Sep. 26, 2014

(87) PCT Pub. No.: WO2013/149173
PCT Pub. Date: Oct. 3, 2013

(65) Prior Publication Data
US 2015/0104660 A1 Apr. 16, 2015

Related U.S. Application Data

(60) Provisional application No. 61/618,236, filed on Mar. 30, 2012.

(51) Int. Cl.
| | | |
|---|---|---|
| *C08F 2/46* | (2006.01) | |
| *C08G 61/04* | (2006.01) | |
| *C09D 11/02* | (2014.01) | |
| *C09D 11/101* | (2014.01) | |
| *C09D 11/322* | (2014.01) | |
| *C09D 11/037* | (2014.01) | |
| *C09D 4/00* | (2006.01) | |
| *C09D 11/106* | (2014.01) | |
| *C08F 222/14* | (2006.01) | |

(52) U.S. Cl.
CPC .............. *C09D 11/02* (2013.01); *C08F 222/14* (2013.01); *C09D 4/00* (2013.01); *C09D 11/037* (2013.01); *C09D 11/101* (2013.01); *C09D 11/106* (2013.01); *C09D 11/322* (2013.01)

(58) Field of Classification Search
CPC .... C09D 11/02; C09D 11/037; C09D 11/101; C09D 11/322
USPC .................................................. 522/1; 520/1
See application file for complete search history.

(56) References Cited

U.S. PATENT DOCUMENTS

| | | |
|---|---|---|
| 2,212,506 A | 8/1940 | Gustave et al. |
| 2,245,567 A | 6/1941 | Brant et al. |
| 2,277,479 A | 3/1942 | D'Alelio |
| 2,313,501 A | 3/1943 | Byrant |
| 2,330,033 A | 9/1943 | D'Alelio |
| 2,403,791 A | 7/1946 | D'Alelio |
| 2,730,457 A | 1/1956 | Green et al. |
| 3,042,710 A | 7/1962 | Dickstein et al. |
| 3,197,318 A | 7/1965 | Halpern et al. |
| 3,203,915 A | 8/1965 | Gaetano |
| 3,221,745 A | 12/1965 | Coover, Jr. |
| 3,427,250 A | 2/1969 | Haas et al. |
| 3,523,097 A | 8/1970 | Coover, Jr. |
| 3,557,185 A | 1/1971 | Ito |
| 3,591,676 A | 7/1971 | Fassett et al. |
| 3,595,869 A | 7/1971 | Shuman |
| 3,677,989 A | 7/1972 | Jenkinson |
| 3,728,373 A | 4/1973 | Borner et al. |
| 3,758,550 A | 9/1973 | Eck et al. |
| 3,936,486 A | 2/1976 | Egger et al. |
| 3,940,362 A | 2/1976 | Overhurlts |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |

(Continued)

FOREIGN PATENT DOCUMENTS

| | | |
|---|---|---|
| CN | 102901754 A | 1/2013 |
| GB | 432628 | 7/1935 |

(Continued)

OTHER PUBLICATIONS

M. Ware et al.: "DBU: An Efficient Catalyst for Knoeveganel Condensation under Solvent-free Condition," Bulletin of the Catalysis Society of India, (2007), vol. 6, pp. 104-106.
V. G. Nenajdenko et al.: "Reaction of 2-Methylene-1,3-Dicarbonyl Compounds Containing a CF3-Group with 1,3-Dienes," Tetrahedron, (2000), vol. 56, pp. 6549-6556.
J. S. Yadav et al.: "Phosphane-Catalyzed Knoevenagel Condensation: a Facile Synthesis of a-Cyanoacrylates and a-Cyanoacrylonitriles," Eur. J. Org. Chem. (2004), pp. 546-551.
B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org. Chem., (2006), pp. 3767-3770.
H. A. Oskooie et al.: "On Water: an Efficient Knoevenagel Condensation using 12-Tungstophosphoric Acid as a Reusable Green Catalyst," Synthetic Communications, (2006), vol. 36, pp. 2819-2823.

(Continued)

*Primary Examiner* — Ling Choi
*Assistant Examiner* — Jessica E Whiteley
(74) *Attorney, Agent, or Firm* — Ulmer & Berne LLP

(57) ABSTRACT

Ink and coating compositions, printing and coating processes, and printed and coated substrates utilizing a polymerizable composition comprising one or more di-activated vinyl compounds, with the proviso that said a di-activated vinyl compound is not a cyanoacrylate. Exemplary compositions include methylene malonates, methylene β-ketoesters, methylene β-diketones, dialkyl disubstituted vinyls, and dihaloalkyl disubstituted vinyls. Exemplary compositions are polymerizable at ambient temperatures.

15 Claims, No Drawings

(56) References Cited

U.S. PATENT DOCUMENTS

| | | |
|---|---|---|
| 4,036,985 A | 7/1977 | Amato et al. |
| 4,046,943 A | 9/1977 | Smith et al. |
| 4,049,698 A | 9/1977 | Hawkins et al. |
| 4,056,543 A | 11/1977 | Ponticello |
| 4,079,058 A | 3/1978 | Ackermann et al. |
| 4,080,238 A | 3/1978 | Wolinski et al. |
| 4,083,751 A | 4/1978 | Choi et al. |
| 4,102,809 A | 7/1978 | Smith et al. |
| 4,105,688 A | 8/1978 | Arni et al. |
| 4,118,422 A | 10/1978 | Klein |
| 4,140,584 A | 2/1979 | Margen |
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A * | 8/1983 | Klenk et al. ............... 138/118.1 |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,698,333 A | 10/1987 | Fauss et al. |
| 4,720,543 A | 1/1988 | McPherson et al. |
| 4,724,053 A | 2/1988 | Jasne |
| 4,727,801 A | 3/1988 | Figari |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,828,882 A | 5/1989 | Tsezos et al. |
| 4,835,153 A | 5/1989 | Kabota et al. |
| 4,840,949 A | 6/1989 | Korbonits et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,328,687 A | 7/1994 | Leung et al. |
| 5,334,747 A | 8/1994 | Steffen |
| 5,397,812 A | 3/1995 | Usami et al. |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 | 2/2001 | Narang et al. |
| 6,210,474 B1 | 4/2001 | Romano et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl et al. |
| 6,376,019 B1 | 4/2002 | Leung |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,518,677 B1 | 2/2003 | Capote |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,070,675 B2 | 7/2006 | Schmidt et al. |
| 7,109,369 B2 | 9/2006 | Nose et al. |
| 7,169,727 B2 | 1/2007 | Thorman |
| 7,208,621 B2 | 4/2007 | Nose et al. |
| 7,305,850 B2 | 12/2007 | Tonkovich et al. |
| 7,450,290 B2 | 11/2008 | Xu et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |
| 7,663,000 B2 | 2/2010 | Dekkers et al. |
| 7,678,847 B2 | 3/2010 | Yan et al. |
| 7,771,567 B2 | 8/2010 | Rives et al. |
| 7,900,558 B2 | 3/2011 | Yokoi |
| 8,119,214 B2 | 2/2012 | Schwantes et al. |
| 8,206,570 B2 | 6/2012 | Deniau |
| 8,318,060 B2 | 11/2012 | Sundberg et al. |
| 8,609,885 B2 | 12/2013 | Malofsky et al. |
| 8,884,051 B2 | 11/2014 | Malofsky et al. |
| 2001/0005572 A1 | 6/2001 | Nair et al. |
| 2001/0034300 A1 | 10/2001 | Yurugi et al. |
| 2002/0151629 A1 | 10/2002 | Buffkin et al. |
| 2003/0096069 A1 | 5/2003 | D'Alessio |
| 2003/0199655 A1* | 10/2003 | Yurugi et al. ............... 526/320 |
| 2004/0076601 A1 | 4/2004 | Bru-Magniez et al. |
| 2004/0086243 A1 | 5/2004 | DiGiovanni et al. |
| 2004/0220060 A1 | 11/2004 | Bartley et al. |
| 2006/0001158 A1 | 1/2006 | Matayabas et al. |
| 2006/0167267 A1 | 7/2006 | Chorghade et al. |
| 2006/0211809 A1 | 9/2006 | Kodemura et al. |
| 2007/0043145 A1 | 2/2007 | Beck et al. |
| 2007/0049655 A1 | 3/2007 | Yoshimune et al. |
| 2007/0092483 A1 | 4/2007 | Pollock |
| 2008/0131618 A1 | 6/2008 | Nakamura et al. |

(56) References Cited

U.S. PATENT DOCUMENTS

| | | |
|---|---|---|
| 2008/0187655 A1 | 8/2008 | Markle et al. |
| 2008/0227919 A9 | 9/2008 | Li et al. |
| 2008/0241485 A1 | 10/2008 | Shimomura et al. |
| 2009/0087151 A1 | 4/2009 | Benjamin et al. |
| 2009/0200652 A1 | 8/2009 | Oh et al. |
| 2009/0286433 A1 | 11/2009 | Watanabe |
| 2010/0124649 A1 | 5/2010 | Rukavina et al. |
| 2010/0286438 A1 | 11/2010 | Malofsky et al. |
| 2011/0015406 A1 | 1/2011 | Umentani et al. |
| 2011/0024392 A1 | 2/2011 | Sato et al. |
| 2011/0164322 A1 | 7/2011 | Morozumi et al. |
| 2011/0244010 A1 | 10/2011 | Doshi |
| 2011/0255156 A1 | 10/2011 | Jethmalani et al. |
| 2012/0261807 A1 | 10/2012 | Itoh et al. |
| 2013/0281580 A1 | 10/2013 | Malofsky et al. |
| 2014/0173889 A1 | 6/2014 | Johnson et al. |
| 2014/0248485 A1 | 9/2014 | Malofsky et al. |
| 2014/0275400 A1 | 9/2014 | Chen et al. |
| 2015/0104660 A1 | 4/2015 | Malofsky et al. |
| 2015/0210894 A1 | 7/2015 | Malofsky et al. |

FOREIGN PATENT DOCUMENTS

| | | |
|---|---|---|
| GB | 965676 | 8/1964 |
| GB | 975733 | 11/1964 |
| JP | 02-281013 | 11/1990 |
| JP | 200019936 | 7/2000 |
| JP | 2008174494 | 1/2007 |
| WO | 99/46619 | 9/1999 |
| WO | 99/55394 | 11/1999 |
| WO | 2007/120630 | 10/2007 |
| WO | 2011/059104 | 12/2011 |
| WO | 2011/161045 | 12/2011 |

OTHER PUBLICATIONS

H. Jiang et al.: "Inorganic Zinc Salts Catalyzed Knoevenagel Condensation at Room Temperature without Solvent," Preparative Biochemistry & Biotechnology, (2009), vol. 39, pp. 194-200.

B. M. Reddy et al.: "An Easy-to-use Heterogeneous Promoted Zirconia Catalyst for Knoevenagel Condensation in liquid Phase under Solvent-Free conditions," Journal of Molecular Catalysis A: Chemical, (2006), vol. 258, pp. 302-307.

D. H. Jung et al.: "New and General Methods for the Synthesis of Arylmethylene Bis(3-Hydroxy-2-Cyclohexene-1-Ones) and Xanthenediones by EDDA and In(OTf)3-Catalyzed One-Pot Domino Knoevenagel/Michael or Koevenagel/Michael/ Cyclodehydration Reactions," Bull. Korean Chem. Soc. (2009) vol. 30, No. 9, pp. 1989-1995.

P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.

P. Klemarwczyk: "A General Synthesis of 1,1 Disubstituted Electron Deficient Olefins and their Polymer Properties," Polymer, (1998), vol. 39, No. 1, pp. 173-181.

C. Gill et al.: "Knoevenagel Condensation in Neutral Media: A simple and efficient protocol for the Synthesis of Electrophillic alkenes Catalyzed by Anhydrous Ferric Sulphate with Remarkable Reusability," Department of Chemistry, Dr. Babasaheb Ambedkar Marathwada University, Auranlabad 431 004 (MS), India, (n/a), pp. n/a.

P. Ballesteros et al.: "DI-tert-Butyl Methylenemalonate [Propanedioic Acid, Methylene-, bis(1,1-dimethylethyl)ester]," Organic Syntheses. Coil. (1990), vol. 7, p. 142; (1986) vol. 64, p. 63.

A. M. Vetrova et al.: "Improvement of the Thermal Stability of Cyanoacrylate Adhesives,"Polymer Science, Series D, (2009), vol. 2, No. 1, pp. 27-30.

A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.

G. Lai et al.: "Ionic Liquid Functionalized Silica Gel: Novel Catalyst and Fixed Solvent,"Tetrahedron Letters (2006), vol. 47, pp. 6951-6953.

J. R. Harjani et al.: "Lewis Acidic Ionic Liquids for the Synthesis of Electrophilic Alkenes via the Knoevenagel Condensation," Tetrahedron Letters, (2002), vol. 43, pp. 1127-1130.

P. Ballesteros et al.: "Synthesis of DI-tert-Butyl Methylenemalonate, a Sterically Hindered 1,1-Dicarbonyl Alkene," J. Org. Chem, (1983), vol. 48, pp. 3603-3605.

T. Doi et al.: "Synthesis of Dimethyl gloiosiphne A by Way of Palladium-Catalyzed Domino Cyclization," J. Org. Chem., (2007), vol. 72, pp. 3667-3671.

Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.

McNab, Kirk-Othmer Encyclopedia of chemical Technology, Pyrolysis, Flash Vacuum, 2009, John Wiley & Sons, Inc., pp. 1-26.

Block, Diethyl bis (hydroxymethyl) malonate Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1. 1781-026 WO.

Magdalini Matziari et al. "Active methylene phosphinic peptides: a new diversification approach", Organic Letters., vol. 8, No. 11, 2006, pp. 2317-2319, USACS, Washington DC, ISSN: 1523-7060.

Zaragoza Dorwald, Side Reactions in Organic Synthesis, 2005, WILEY-VCH Verlag GmbH & Co., KgaA, Weinheim, Preface. p. IX.

K. Okamura and T. Date, A Facile Conversion of Ethoxydihydropyrans to 4-Cyanoethylisoxazoles, J. Heterocyclic Chem. 33, 383 (1996).

Valentine G. Nenajdenko et al, Reaction of 2-Methylene-1,3-dicarbonyl Compounds Containing a CF3-Group with 1,3-Dienes Tetrahedron 56 (2000) 6549-6556.

Yamauchi et al. "Reactivity of 2-methyene-1,3-dicarbonyl compounds: catalytic enantioselective Diels-Alder reaction", Tetrahedron Asymetry 12, (2001), 3113-3118.

Cristoph Schotes et al. "Cu(I)—and C(II)—Catalyzed Cyclo—and Michael Addition Reactions of Unsaturated [beta]—Ketoesters" The Journal of Organic Chemistry, vol. 76, No. 14 dated Jul. 15, 2011 p. 5862-5866.

Alejandro Bugarin et al. "Efficient direct [alpha]-methylenation of carbonyls mediated by dissopropylammonium trifluoroacetate", Chemical Communications, vol. 46, No. 10 dated Jan. 1, 2010.

H. Hoffman et al. "Preparation and Selected Reaction of tery-Butyl 2-Methylene-3-oxoalkanoates" Chem. Ber., vol. 124 dated Jan. 1, 1991, pp. 2475-2480.

M. Yamauchi et al. "Reactivity of 2-Methylene-1,3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.

Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.

Juliana Vale et al. "Efficient [alpha]-Methylenation of Carbonyl Compounds in Ionic Liquids at Room Temperature", Synlett, vol. 2009, No. 1, Jan. 1, 2009, pp. 75-78, XP055170349, ISSN: 0936-5214, DOI: 10.1055/s-0028-1087389.

Weiss et al. Miniemulsion Polymerization as a Means to Encapsulate Organic and Inorganic Materials, Adv. Polymer Science, 2010, pp. 1-52, DOI:10.1007/12_2010_61.

Bhatia, Encapsulation of Particles Using Brittle Subterranean Applications, Thesis submitted to College of Engineering and Mineral Resources at West Virginia University in partial fulfillment of the requirements for the degree of Master of Science in Chemical Engineering, 1999.

McFarland et al, Free Radical Frontal Polymerization with a Microencapsulated Initiator, Macromolecules 2004, vol. 37, pp. 6670-6672.

International Search Report (ISR) and Written Opinion of the Searching Authority in App. No. PCT/US2014/011068 dated as mailed May 12, 2014.

(56) References Cited

OTHER PUBLICATIONS

International Search Report (ISR) and Written Opinion of the Searching Authority in App. No. PCT/US2011/056903 dated as mailed Jun. 7, 2012.
International Search Report (ISR) and Written Opinion of the Searching Authority in App. No. PCT/US2011/056926 dated as mailed Feb. 28, 2012.
International Search Report (ISR) and Written Opinion of the Searching Authority in App. No. PCT/US2012/060830 dated as mailed Feb. 1, 2013.
International Search Report (ISR) and Written Opinion of the Searching Authority in App. No. PCT/US2012/060840 dated as mailed Mar. 12, 2013.
International Search Report (ISR) and Written Opinion of the Searching Authority in App. No. PCT/US2012/060837 dated as mailed Jan. 9, 2013.
International Search Report (ISR) and Written Opinion of the Searching Authority in App. No. PCT/US2013/034636 dated as mailed Jun. 20, 2013.
International Search Report (ISR) and Written Opinion of the Searching Authority in App. No. PCT/US2013/034641 dated as mailed Jun. 25, 2013.
International Search Report (ISR) and Written Opinion of the Searching Authority in App. No. PCT/US2013/034649 dated as mailed Aug. 27, 2013.
International Search Report (ISR) and Written Opinion of the Searching Authority in App. No. PCT/US2013/043711 dated as mailed Nov. 22, 2013.
International Search Report (ISR) and Written Opinion of the Searching Authority in App. No. PCT/US2013/070355 dated as mailed Mar. 19, 2014.
International Search Report (ISR) and Written Opinion of the Searching Authority in App. No. PCT/US2013/072203 dated as mailed Apr. 18, 2014.
European Search Report of the European Patent Office, Issued in European Application No. 13770173.6-1301/2831124; dated as mailed on Oct. 9, 2015; 7 pages.
Notice of References for U.S. Appl. No. 14/725,532, dated as mailed on Nov. 5, 2015; 1 page.

* cited by examiner

INK COATING FORMULATIONS AND POLYMERIZABLE SYSTEMS FOR PRODUCING THE SAME

CROSS REFERENCE TO RELATED APPLICATIONS

This application is a 35 U.S.C. §371 National Phase Application of International PCT Patent Application No. PCT/US2013/034649, filed Mar. 29, 2013, which application claims the benefit of priority to U.S. Provisional Patent Application Ser. No. 61/618,236, filed Mar. 30, 2012 entitled Ink and Coating Formulations and Polymerizable Systems For Producing the Same, the contents of each of which are hereby incorporated herein by reference in their entireties.

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the invention.

BACKGROUND OF THE INVENTION

1. Field of the Invention

Exemplary embodiments disclosed herein related to inks and coatings and polymerizable systems therefor. Of particular interest are polymerizable di-substituted, di-activated vinyl compositions, not including cyanoacrylates, such as, but not limited to, methylene malonates, methylene β-ketoesters, methylene β-di-ketones, dialkyl disubstituted vinyl, dihaloalkyl disubstituted vinyl, whether monofunctional, difunctional or multifunctional monomers, oligomers or polymers.

2. Background

Methylene malonates are compounds having the general formula (I):

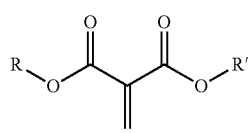

wherein R and R' may be the same or different and may represent nearly any substituent or side-chain. Such compounds have been known since 1886 where the formation of diethyl methylene malonate was first demonstrated by W. H. Perkin, Jr. (Perkin, Ber. 19, 1053 (1886)).

However, earlier methods for producing methylene malonates suffer significant deficiencies that preclude their use in obtaining commercially viable monomers. Such deficiencies include unwanted polymerization of the monomers during synthesis, formation of undesirable side products, degradation of the product, insufficient and/or low yields, and ineffective and/or poorly functioning monomer product. These problems have impinged on their practical use in the production of commercial and industrial products.

Certain co-inventors of the instant application have recently filed patent applications on improved methods of synthesis of methylene malonates, namely, PCT/US11/056,903 Synthesis of Methylene Malonates Substantially Free of Impurities, and PCT/US11/056,926 Synthesis of Methylene Malonates Using Rapid Recovery in the Presence of a Heat Transfer Agent. The synthesis procedures provided therein result in improved yields of heretofore elusive high quality methylene malonates and other polymerizable compositions.

The polymerizable compositions are amenable to chain-building and/or cross-linking polymerization by anionic or free radical initiation and have the potential to form the basis of a highly valuable and large-scale platform for the chemical synthesis and formulation of new chemical products.

In the art, there exists a need for new classes of commercially viable products, in particular, inks and coatings. Specifically, the commercial reduction to practice of a low or zero energy input, very fast polymerizing addition polymer platform with far ranging property sets coupled with crosslinking that is also by design environmentally, biologically or metabolically compatible with most living organisms that is finally also either in whole or part made from a broad sustainable resource base, including sugars, atmospheric gases, waste gases and synthesis gas opens up a vast array of new technologies that can deliver great benefits to society.

One particular need in the art is for coatings, inks and the like where a protective and/or decorative layer could be applied as a 100% solids reactive composition that could cure, if desired, nearly instantaneously, with little or no energy input. Such ink or coating compositions could have dramatic impact on energy use reduction as well as significant reduction in solvent use. Either alone or in combination with a surface activator, such systems would eliminate the need for two part condensation polymerization or addition polymerization systems where complex, precise mixing and metering systems are required. Further, such systems would reduce or eliminate the need for sophisticated ovens required to control temperature and solvent volatilization. Finally, such desirable systems would reduce the level of catalyst, preferably less than 2% by weight catalyst, to dramatically reduce leaching non-bound chemical elements and provide for more facile activation.

Such a non-thermally activated and/or accelerated system dramatically would change the types of materials one could use in manufacturing the related substrates and the steps at which they could be used. By example, where certain thermoplastics or decorative elements may not survive a typical 150° C. or higher oven cure for 20 minutes or more, at ambient temperatures virtually any known material could be utilized.

In the art is it desired to provide functional and/or decorative coatings or inks that could be 100% solids and that would not require pre-polymerization into emulsions. It is also desired to have such coatings or inks that would be environmentally resistant, that did not require energy input (heat or light) for activation. Such coatings and inks could provide key benefits such as the substantial reduction of energy use on application and cure, elimination of complex solvent handling and recovery equipment, the elimination of the energy related equipment, and the ability to use said systems for thermally sensitive substrates. By example, the ability to replace ultraviolet light cure systems for inks and overprint varnishes would provide all of the aforementioned benefits. Also desired is the replacement of emulsion-based inks where environmental resistance is poor, where 50% water compositions must be contained and shipped and managed and where an instant cure would provide for far more raid throughput for the office or home user where ultraviolet light systems are costly, complex and even dangerous to manage.

Thus, new classes of commercially viable products, in particular, coating and ink formulations, processes and application equipment and the articles utilizing such materials are highly desired in the art.

SUMMARY OF THE INVENTION

Accordingly, exemplary embodiments disclosed herein meet these and other needs by providing new classes of substantially 100% solids coating or ink systems requiring low catalyst loading, that offer on-demand, high speed, substantially energy free, ambient curing, that may be designed to be environmentally, biologically and/or metabolically compatible. Additionally, exemplary embodiments optionally include crosslinkable systems for improved chemical and physical properties.

Exemplary embodiments disclosed herein provide examples in the use of methylene malonate monomers and other polymerizable compositions (e.g., monomers, oligomers, and/or polymers) as reactive inks and coatings. Of particular interest are polymerizable ink and/or coating compositions such as di-substituted, di-activated vinyl compositions such as, but not limited to, methylene malonates, methylene β-ketoesters, methylene β-diketones, dialkyl disubstituted vinyl, dihaloalkyl disubstituted vinyl, whether monofunctional, difunctional or multifunctional monomers, oligomers or polymers. Such compositions and their associated monomeric and polymeric-based products could be useful in household, industrial and medical applications and settings. Additionally, unlike many other monomers, exemplary methylene malonate and related monomers and their products can be produced via sustainable routes as well as be designed to be environmentally and/or biologically benign and as such many of the products can be generally regarded as "green."

One exemplary embodiment disclosed herein relates to an ink composition. The reactive composition comprises a polymerizable composition including a di-activated vinyl compound such as a methylene malonate, methylene β-ketoester, methylene β-diketone, dialkyl disubstituted vinyl, dihaloalkyl disubstituted vinyl; and optionally, a coloring agent.

Another exemplary embodiment disclosed herein provides a system comprising an ink composition comprising a polymerizable composition comprising at least one member of the group consisting of a methylene malonate, methylene β-ketoester, methylene β-diketone, dialkyl disubstituted vinyl, dihaloalkyl disubstituted vinyl and, optionally, a coloring agent; and a polymerization activator.

In one aspect, the invention provides an ink composition comprising a polymerizable composition comprising one or more di-activated vinyl compounds, with the proviso that said a di-activated vinyl compound is not a cyanoacrylate; and optionally, a coloring agent.

In certain embodiments of the ink composition of the invention, the di-activated vinyl compound is at least one member of the group consisting of methylene malonate, methylene β-ketoester, methylene β-diketone, dialkyl disubstituted vinyl, and dihaloalkyl disubstituted vinyl. In still other embodiments, the di-activated vinyl compound is a multifunctional di-activated vinyl compound.

In other embodiments of the ink composition of the invention, the coloring agent is at least one member of the group consisting of: organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury, titanium pigment, aluminum pigment, manganese pigment, ultramarine pigment, zinc pigment, arsenic pigment, tin pigment, iron oxide pigment, antimony pigment, barium pigment, a biological pigment, dye, photochromic, conductive and liquid crystal polymer pigment. piezochromic pigment, goniochromatic pigment, silver pigment, diketopyrrolo-pyrrole, benzimidazolone, isoindoline, isoindolinone, radio-opacifier.

In some embodiments of the ink composition of the invention, the polymerizable composition is substantially 100% solids. In other embodiments of the ink composition of the invention, the composition has shelf-life of at least 6 months at ambient temperature.

In certain embodiments of the ink composition of the invention, the polymerizable composition is able to polymerize through an anionic cure mechanism. In other embodiments, the polymerizable composition is cross-linked during polymerization. In still other embodiments, the polymerizable composition is curable at ambient temperature.

In other embodiments of the ink composition of the invention, the composition further comprises an activating agent in the form of a base, a base precursor, a base, or base enhancer. In certain embodiments, the polymerization activator is selected from an organic material, an inorganic material or an organo-metallic material, or a combination thereof. In other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In still other embodiments, the composition further comprises a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect, the invention provides, a coating composition comprising a polymerizable composition comprising one or more di-activated vinyl compounds, with the proviso that said a di-activated vinyl compound is not a cyanoacrylate.

In certain embodiments of the coating composition of the invention, the di-activated vinyl compound is at least one member of the group consisting of methylene malonate, methylene β-ketoester, methylene β-diketone, dialkyl disubstituted vinyl, and dihaloalkyl disubstituted vinyl. In still other embodiments, the di-activated vinyl compound is a multifunctional di-activated vinyl compound.

In other embodiments of the coating composition of the invention, the coating may further include a coloring agent, including, but not limited to, organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury, titanium pigment, aluminum pigment, manganese pigment, ultramarine pigment, zinc pigment, arsenic pigment, tin pigment, iron oxide pigment, antimony pigment, barium pigment, a biological pigment, dye, photochromic, conductive and liquid crystal polymer pigment. piezochromic pigment, goniochromatic pigment, silver pigment, diketopyrrolo-pyrrole, benzimidazolone, isoindoline, isoindolinone, radio-opacifier.

In some embodiments of the ink composition of the invention, the polymerizable composition is substantially 100% solids. In other embodiments of the ink composition of the invention, the composition has shelf-life of at least 6 months at ambient temperature.

In certain embodiments of the coating composition of the invention, the polymerizable composition is able to polymerize through an anionic cure mechanism. In other embodiments, the polymerizable composition is cross-linked during polymerization. In still other embodiments, the polymerizable composition is curable at ambient temperature.

In other embodiments of the coating composition of the invention, the composition further comprises an activating agent in the form of a base, a base precursor, a base, or base enhancer. In certain embodiments, the polymerization activator is selected from an organic material, an inorganic material or an organo-metallic material, or a combination thereof. In other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In still other embodiments, the composition further comprises a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, In another aspect, the invention provides a process for printing onto a substrate comprising:
providing an ink composition comprising a polymerizable composition comprising one or more di-activated vinyl compounds with the proviso that said a di-activated vinyl compound is not a cyanoacrylate, and, optionally, a coloring agent, to an ink delivery mechanism; and
delivering the ink composition from the ink delivery mechanism to a substrate.

In certain embodiments of the printing process, the di-activated vinyl compound is at least one member of the group consisting of methylene malonate, methylene β-ketoester, methylene β-diketone, dialkyl disubstituted vinyl, and dihaloalkyl disubstituted vinyl.

In other embodiments of the printing process, the coloring agent is at least one member of the group consisting of: organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury pigment, titanium pigment, aluminum pigment, manganese pigment, ultramarine pigment, zinc pigment, arsenic pigment, tin pigment, iron oxide pigment, antimony pigment, barium pigment, a biological pigment, dye, photochromic, conductive and liquid crystal polymer pigment. In certain embodiments, the coloring agent may be colorless, fluorescent or iridescent.

In another embodiment, the printing process, further comprises the step of providing an polymerization activator in the form of a base, a base precursor, a base converter, or base enhancer.

In another embodiment, the printing process, further comprises the step of polymerizing the polymerizable composition to form an inked image on the substrate.

In still another embodiments of the process, the polymerization of the polymerizable composition occurs upon delivery to the substrate.

In yet another embodiments, the printing process further comprises a step of providing a polymerization activator to the substrate, wherein the polymerization activator includes a base, a base precursor, a base converter, or base enhancer. In some embodiments, the polymerization of the polymerizable composition occurs upon contact with the polymerization activator.

In certain embodiments, the polymerization activator is selected from an organic material, an inorganic material or an organo-metallic material, or a combination thereof. In other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In still other embodiments, the ink delivery mechanism is adapted to deliver a polymerization activator through a separate pathway from a pathway for delivering the polymerizable composition.

In some embodiments, the printing process further comprises a step of adding at least one formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect, the invention provides a printing system comprising:
- a first container comprising a polymerizable composition comprising one or more di-activated vinyl compounds with the proviso that said a di-activated vinyl compound is not a cyanoacrylate; and
- a second container, separate from the first container, comprising a polymerization activator.

In certain embodiments of the printing system, the polymerization activator includes a base, a base precursor, a base converter, or base enhancer. In other embodiments, the polymerization activator comprises a basic material selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In some embodiments, the printing system further comprises at least one formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In other embodiments of the printing system, the first and second containers are carried in an ink cartridge.

In still another aspect, the invention provides, a printing system comprising:
- a printer cartridge including a chamber;
- a polymerizable composition within the chamber comprising one or more di-activated vinyl compounds, with the proviso that said a di-activated vinyl compound is not a cyanoacrylate;
- a polymerization activator within the chamber, wherein the polymerization activator is prevented through physical or chemical means from initiating polymerization until predetermined activating conditions are met.

In certain embodiments,

In certain embodiments of the printing system, the polymerization activator includes a base, a base precursor, a base converter, or base enhancer. In other embodiments, the polymerization activator comprises a basic material selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In some embodiments, the printing system further comprises at least one formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect, the invention provides, a process for coating a substrate comprising
- providing a coating composition a polymerizable composition comprising one or more di-activated vinyl compounds, with the proviso that said a di-activated vinyl compound is not a cyanoacrylate, and, optionally, a coloring agent; to an coating delivery mechanism; and
- coating a substrate with the coating composition from the coating delivery mechanism.

In certain embodiments of the coating process, the di-activated vinyl compound is at least one member of the group consisting of methylene malonate, methylene β-ketoester, methylene β-diketone, dialkyl disubstituted vinyl, and dihaloalkyl disubstituted vinyl.

In other embodiments, the coating process further comprises the step of polymerizing the polymerizable composition to form the coating. In certain embodiments, the polymerization of the polymerizable composition occurs upon delivery to the substrate.

In other embodiments, the printing process further comprises a step of providing a polymerization activator to the substrate. In certain embodiments, the polymerization activator includes a base, a base precursor, a base converter, or base enhancer. In still other embodiments, the polymerization activator comprises a basic material selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In other embodiments, the polymerization of the polymerizable composition occurs upon contact with the polymerization activator.

In another embodiment, the substrate is a plant-based material, plastic, carbon-based material, metal, or a glass-based material. In certain embodiments, the substrate is paper, oak, Douglass fir, balsa, polyphenylene ether (PPE) plastic, polycarbonate (PC), silicon, glass, fiberglass, silver coated copper, copper, steel, or aluminum.

In still other embodiments, the coating process further comprises, the step of adding a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect, the invention provides a coated article comprising:
a substrate;
a coating on at least a portion of said substrate, wherein the coating includes a coating produced by polymerizing a polymerizable composition comprising one or more di-activated vinyl compounds, with the proviso that said a di-activated vinyl compound is not a cyanoacrylate.

In certain embodiments of the coated article, the one or more di-activated vinyl compounds is at least one of a methylene malonate, methylene β-ketoester, methylene β-diketone, dialkyl disubstitued vinyl, dihaloalkyl disubstituted vinyl.

In certain other embodiments of the coated article, the substrate is a plant-based material, plastic, carbon-based material, metal, or a glass-based material. In particular embodiments, the substrate is paper, oak, Douglass fir, balsa, polyphenylene ether (PPE) plastic, polycarbonate (PC), silicon, glass, fiberglass, silver coated copper, copper, steel, or aluminum.

In still other embodiments, the coated article is an automobile component, a metal can, a plastic container, a construction material.

In yet other embodiments, of the coated article, the coated article may include at least one thermally sensitive material.

In another aspect, the invention provides a system for coating an article, comprising:
a) a coating composition comprising a polymerizable composition comprising one or more di-activated vinyl compounds, with the proviso that said a di-activated vinyl compound is not a cyanoacrylate; and
b) means for applying the coating composition to the article.

In certain embodiments, the coating system, further comprises:
c1) a polymerization activator; or
c2) a surface coupling agent; or
c3) both an activating agent and a surface coupling agent; each of which are capable of being applied by means for applying b).

In other embodiments, of the coating system the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers. In other embodiments of the coating system, the coupling agent is at least one member of the group consisting of a silane, tetramethylguanidine, titanate, and a salt of an acid-containing polymer, and salt of polyacrylic acid co-polymer.

In still other embodiments, the coating system, further comprises a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

The purpose and advantages of the present invention will be set forth in and apparent from the description that follows. Additional advantages of the invention will be realized and attained by the methods and systems particularly pointed out in the written description and claims hereof, as well as from the appended drawings.

These and other embodiments are disclosed or are obvious from and encompassed by, the following Detailed Description.

DESCRIPTION OF THE INVENTION

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale &Marham, The Harper Collins Dictionary of Biology (1991). As used herein, the following terms have the meanings ascribed to them below, unless specified otherwise.

As used herein, the term "methylene malonate" refers to a compound having the core formula —O—C(O)—C(=CH$_2$)—C(O)—O—. Diethyl methylene malonate monomer is a methylene malonate having two ethyl groups and is denoted DEMM herein. Dimethyl methylene malonate monomer has two methyl end groups and is denoted DMMM or D3M herein.

As used herein, the term "methylene beta-ketoester" or "methylene □-ketoester", refers to a compound having the core formula —C(O)—C(=CH2)—C(O)O—.

As used herein, the term "methylene beta-diketone" or "methylene β-diketone" refers to a compound having the core formula —C(O)—C(=CH2)—C(O)—.

As used herein, the term "polymerizable composition" refers to a monomeric, oligomeric, or polymeric composition or mixture comprising molecules that are able to be polymerized by chain extension, cross-linking, or both.

As used herein, the term "monofunctional" refers to an addition monomer, for example a methylene malonate, having only one addition polymerizable group.

As used herein, the term "difunctional" refers to an addition polymerizable function containing monomer, oligomer, resin or polymer, with two such addition polymerizable groups, such as two methylene malonate groups.

As used herein, the term "multifunctional" refers to an addition polymerizable function containing monomer, oligomer, resin or polymer, with three or more such addition polymerizable groups, such as three or more methylene malonate groups. Thus "difunctional" is a specific example of "multifunctional."

As used herein, the terms "volatile" and "non-volatile" refers to a compound which is capable of evaporating readily at normal temperatures and pressures, in the case of volatile; or which is not capable of evaporating readily at normal temperatures and pressures, in the case of non-volatile.

As used herein, the term "formulation additives" refers to additives included in a formulated system to enhance physical or chemical properties thereof and to provide a desired result. Such formulation additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence or other markers, thermal degradation reducers, thermal resistance conferring agents, surfactants, wetting agents, defoamers, dispersants, flow or slip aids, biocides, and stabilizers.

The term "pigment" as used herein refers to any agent able to impart color or opacity to the exemplary compositions disclosed herein. Thus, an agent such as organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury pigment, titanium pigment, aluminum pigment, manganese pigment, ultramarine pigment, zinc pigment, arsenic pigment, tin pigment, iron oxide pigment, antimony pigment, barium pigment, a biological pigment, dye, photochromic, conductive and liquid crystal polymer pigment. piezochromic pigment, goniochromatic pigment, silver pigment, diketopyrrolo-pyrrole, benzimidazolone, isoindoline and isoindolinone, radio-opacifier and the like are all referred to herein as a "coloring agent" or "pigment" regardless of solubility in the polymerizable composition.

The term "printing process" as used herein generally encompasses lithography, offset printing, flexography, gravure printing, screen printing, letter press and digital printing processes.

As used herein the term "base" refers to a component having at least one electronegative group capable of initiating anionic polymerization.

As used herein the term "base precursor" refers to a component that may be converted to a base upon being acted upon in some manner, e.g., application of heat, chemical reaction, or UV activation.

As used herein the term "base converters" refers to an agent that is capable of acting in some manner to generate or convert another component into an active base.

As used herein, the term "base enhancer" refers to an agent that is capable of acting in some manner to improve or enhance the basicity of an agent.

Unless otherwise identified, all percentages (%) are "percent by weight."

EXEMPLARY EMBODIMENTS

Exemplary embodiments disclosed herein provide novel and nonobvious improvements in the use of polymerizable compositions (e.g., monomers, oligomers, and/or polymers) as inks and coatings. Of particular interest are polymerizable ink and/or coating compositions comprising di-substituted, di-activated vinyl compositions such as, but not limited to, methylene malonates, methylene β-ketoesters, methylene β-diketones, dialkyl disubstitued vinyl, dihaloalkyl disubstituted vinyl, whether monofunctional, difunctional or multifunctional monomers, oligomers or polymers.

The following examples are provided as proof of concept and are exemplary in nature, and not intended as limiting the invention disclosed herein.

Ink Formulations

Certain exemplary embodiments disclosed herein relate to ink formulations. Five pigment dispersions were added to diethyl methylene malonate monomer without addition of solvent. The pigment dispersions were obtained from Elementis Specialty Chemicals. The five pigments studied are provided in Table 1.

TABLE 1

Pigments

| Color | Pigment | Characterization |
|---|---|---|
| Black | AYD PC9393 | Carbon Black |
| White | AYD PC9003 | Titanium Dioxide |
| Yellow | AYD PC 9454 | An Azo Compound |
| Red | AYD PC9625 | A Quinacridone |
| Blue | AYD PC9298 | A Phthalocyanine |

The ink formulations for DEMM are shown in Table 2. Hydroquinone monomethyl ether (MeHQ) and methane sulfonic acid (MSA) were added as stabilizers to inhibit premature polymerization.

TABLE 2

DEMM Formulations

| Color | DEMM (g) | Pigment Dispersion (g) | MeHQ (ppm) | MSA (ppm) |
|---|---|---|---|---|
| Black | 10 | 2 | 1000 | 3 |
| White | 10 | 2 | 1000 | 3 |
| Yellow | 10 | 1 | 1000 | 100 |
| Red | 10 | 1 | 1000 | 500 |
| Blue | 10 | 0.7 | 1000 | 500 |

MeHQ = hydroquinone monomethyl ether
MSA = methane sulfonic acid

In addition to the DEMM formulations discussed herein, exemplary ink formulations can be made from the methylene malonate family of compounds. Some other exemplary compounds include dimethyl methylene malonate, di-n-propyl methylene malonate, di-isopropyl methylene malonate, dibenzyl methylene malonate. Suitable ink formulations can be made from other methylene malonates, methylene ☐-ketoesters, methylene β-di-ketones, dialkyl disubstitued vinyl, dihaloalkyl disubstituted vinyl, the monofunctional, difunctional, or multifunctional form thereof, and any combination thereof.

Methodology:

The general procedure of making pigment formulations in DEMM comprised placing the monomer in a suitable vessel with a magnetic stir bar. Stirring, without heating, at 900 rpm, and while stirring, slowly adding the selected ink pigment. After the pigment addition, the sample was continuously stirred for an additional 5 minutes.

Comparative Example 1

Pigment Formulations in Ethyl Cyanoacrylate

Similar methodology was used on an ethyl cyanoacrylate purchased from Henkel (Loctite 420). Again, the material was placed into a suitable vessel with a stir bar. The sample was stirred at 900 rpm, without heating. The pigment dispersions were slowly added while stirring. After the pigment addition, the sample was stirred for 5 additional minutes.

Comparative Example 2

Pigment Formulations in Acetone

Similar methodology was used on an acetone sample. Again, the material was placed into a suitable vessel with a stir bar. The sample was stirred at 900 rpm, without heating. The pigment dispersions were slowly added while stirring. After the pigment addition, the sample was stirred for 5 additional minutes.

Observations of Sample Ink Formulations:

The magnetic stirring process provides a solution of formulation with most pigments well dissolved or distributed, while some aggregations of pigment particles are observed. It is suggested that a higher shear method may be utilized for more uniform mixing. Other mixing methods known in the art may be utilized as well such as stirring with a high-speed water-cooled stirrer, or milling on a horizontal bead mill.

Stability Study of DEMM Ink Formulations and Comparative Example 1:

Table 3 presents the results of a stability study comparing DEMM Inks and Comparative Example 1. It was not necessary to include Comparative Sample Number 2 in the stability study as it did not contain a polymerizable composition. The term "With ExtraMSA" relates to a standard amount of MSA used to stabilize DEMM without any pigment dispersion and additional MSA added to counter the basicity of the pigment dispersion. The term "No Extra MSA" relates to the amount of MSA usually added to stabilize DEMM without any pigment dispersion (3-5 ppm). The final amounts of MSA added to the "With Extra MSA" samples are provided in Table 2, above. The trials at 82° C. are used to simulate long-term shelf storage. It is generally accepted in the art that 12 days at 82° C. relates to about 2 years of shelf life at ambient temperature.

TABLE 3

Results of Stability Study

| | Diethyl methylene malonate | | | | Ethyl Cyanoacrylate (Loctite 420) | | | |
|---|---|---|---|---|---|---|---|---|
| | 82° C. | | 25° C. | | 82° C. | | 25° C. | |
| Color | With Extra MSA | No Extra MSA | With Extra MSA | No Extra MSA | With Extra MSA | No Extra MSA | With Extra MSA | No Extra MSA |
| White | 6 days | 6 days | >21 days | >21 days | 12 hrs | 12 hrs | 12 hrs | 12 hrs |
| Black | >14 days | >14 days | >21 days | >21 days | 12 hrs | 12 hrs | 12 hrs | 12 hrs |
| Yellow | >10 days | 5 days | >21 days | 10 days | 12 hrs | 12 hrs | 36 hrs | 12 hrs |
| Red | >10 days | <24 hrs | >21 days | 3 days | 12 hrs | 12 hrs | 30 hrs | 12 hrs |
| Blue | 3 days | <1 hrs | >14 days | <2 hrs | 12 hrs | 12 hrs | 12 hrs | 12 hrs |

MSA = methane sulfonic acid

In all cases, the DEMM Ink formulations "With Extra MSA" exhibited better shelf-life stability than Comparative Example 1 "With Extra MSA." Additionally, all DEMM Ink formulations "No Extra MSA", except Blue at 25° C., outperformed Comparative Example 1 "No Extra MSA." It is noted that generally, the DEMM Ink formulations "With Extra MSA" were more shelf-stable than the "No Extra MSA" DEMM Ink formulations.

Application of Ink Samples to Paper:

A study was undertaken between the DEMM Ink formulations and Comparative Example 2. Comparative Example 1 formulations were not stable and were therefore not included in this study.

DEMM Ink formulations produce high-chroma color that cures instantly on paper. Comparative Example 2 (acetone formulations), although similar in pigment level, provided less saturated color. Comparative Example 1 formulations were not stable enough to include in this study.

Adhesion and Scratch Resistance Testing:

The DEMM ink formulations all instantly cure on paper, oak, Douglass fir, balsa, grit-blasted steel, and polycarbonate. The DEMM ink formulations take approximately one hour to cure on polyphenyl ether polymers (PPE), nylon and regular steel. It is observed that thicker applications of the ink tend to take longer to cure than if the application is very thin.

With primer (e.g., a 5% sodium propionate solution), the DEMM ink formulations cured instantly on all substrates mentioned above and exhibit excellent scratch resistance to a nickel, razor blade, and a fingernail.

Methodology:

Make an X mark with the ink formulation onto the desired substrate. Let the samples fully cure for 24 hours. Score over the X mark with a razor blade. Place a piece of scotch tape over the X mark for 1 minute, then peel off the tape.

Observations:

On most samples, very little ink, if any at all, is taken off from the polycarbonate, oak, Douglas fir, regular steel, and aluminum substrates. In some cases, very small flakes of the ink came off at the scored portion. PPE, nylon and grit blasted steel lose a lot more of the ink pigment as compared to the other substrates.

Water Resistance Test:

The water resistance of DEMM ink formulations on paper was tested for instantaneous results and long-term water resistance. The water resistance of a commercially available product was also tested for comparison.

Methodology:

Sample DEMM ink formulations were applied to paper as above. The inked paper was placed immediately into a tap water bath. A control paper painted with DEMM ink formulations was also made, and kept dry during this trial. Print outs of commercially available inkjet inks (Canon inks) were made as comparative samples, one to test in the water bath, and one to keep dry. Observations of the colorfastness of the inks were made.

Observations:

The DEMM ink formulations can be placed on paper and instantly placed in a tap water bath with no loss of color. The Canon inks, except for black, showed significant color loss after 24 hours. The Canon inks were water-based formulations and not specifically designed to be colorfast in water.

After a week in the tap water bath at room temperature (25° C.), the colors of the DEMM ink formulations were compared to DEMM ink formulation control (dry sample). For the wet sample, DEMM black ink formulation was seen to be partially flaking off. All other DEMM ink formulations remained colorfast.

Ink Cure Speed

Ink formulations were made according to the following formula and mixed together:

| | |
|---|---|
| DEMM: | 89% |
| Pigment Dispersion: | 10% |
| 15-Crown-5 Ether: | 1% |

The pigment dispersions used included red, black, blue, yellow, and white as set forth above. Steel, aluminum, and polycarbonate test panels were primed (activated) by rubbing a 5% sodium propionate solution in ethanol on them using a cotton swab. The ink formulations were then cast over the primed substrates using a #2.5 wire wound rod yielding an ink thickness of approximately 0.25 mil Cure was instantaneous on all substrates and with all colors.

The ink compositions disclosed herein "dry" primarily by curing, i.e., by polymerization of the monomers (monofunctional, difunctional or multifunctional) and hence are curable inks. Such inks do not, therefore, require the presence of water or a volatile organic solvent to effect drying of the ink, although the presence of such components may be tolerated. The inks disclosed herein are preferably substantially free of water and volatile organic solvents, i.e., substantially 100% solids. However, trace amounts of water or volatile organic solvents may be present by absorption from the environment and tolerated in the ink provided they do not cause substantially adversely affect cure.

Coating Formulations

Coatings were prepared on sheets of steel and aluminum acquired from ACT Test Panels LLC. For testing purposes, three different application methods were utilized to prepare the different coatings. In all test cases, the initiator was a solution of 1% by weight phenolformaldehyde resin in methanol, and the polymerizable agent was 99% pure diethyl methylene malonate (DEMM). The following methods of application are the same for both steel and aluminum substrates.

For application method number 1, a line of the initiator was spread across the top of the substrate from a 3 mL dropper, and then a 2.5 gauge Meyer rod was used to drag the initiator down on the substrate resulting in a 0.2 mil film. After the methanol evaporated, which took less than a minute, a line of the DEMM was spread across the top of the substrate from a 3 mL dropper, and the DEMM was cast on the substrate using a 14 gauge Meyer rod resulting in a 1 mil film. Curing began immediately.

When using this application method on steel, the coating cured in 90 seconds. Cure speed is thickness dependent, though, as slightly thicker areas take longer to cure. The result of the crosshatch adhesion test (ASTM D3359) was a 5B, and the result of the Pencil Hardness test (ASTM D3363) was a 5H. A 90 second cure time was also seen when DEMM was cast over primed aluminum. Performance on aluminum was similar as well with a crosshatch test result of 5B and a pencil hardness test result of 6H.

For application method number 2, a line of DEMM was spread across the top of the substrate using a 3 mL dropper, and cast using a 14 gauge Meyer Rod as described above. The initiator was placed in a spray bottle and sprayed on top of the DEMM layer on the substrate. Curing began immediately. When using this application method on steel, the coating was cured in 60 seconds and produced a coating with a crosshatch adhesion of 5B and a pencil hardness of 5H. Cure was slightly slower on aluminum, where the coating took 90 seconds to cure. The resulting coating had a crosshatch adhesion of 4B and a pencil hardness of 6H.

For application method number 3, the initiator was sprayed onto the substrate surface and the solvent allowed to evaporate. Evaporation occurred in less than 60 seconds. Then, the DEMM was cast on the substrate using the previously described procedure. Curing began immediately, but progressed at a much less aggressive rate compared to application methods 1 and 2.

When using this application method on steel, curing occurred slowly, and full cure was obtained after 13 minutes. The resulting coating had a crosshatch adhesion of 5B and a pencil hardness of H. Curing was slightly faster on aluminum where full cure was obtained after 8 minutes, and resulted in a coating with a crosshatch adhesion of 5B and a pencil hardness of HB.

Additional Coatings

A surface coating including pigment dispersions in DEMM can be done on regular steel, polycarbonate, oak, and aluminum. The cure time for a coating formed by drawing down with Meyer rod size 8 is roughly 24 hours at room temperature. The cure time for a coating formed by drawing down with a Meyer rod size 14 also takes roughly 24 hours at room temperature.

Overlaying the cured coatings as above with either DEMM only, or pigmented DEMM can form exemplary multilayer coatings with pigment dispersions. Each additional layer may be applied via Meyer rod, again, with cure times of approximately 24 hours. Placing the substrates in elevated temperatures conditions can speed up the curing of the coating (or coating layers). For example, all coatings, on all substrates, cure within 15 minutes at 55 or 82 degrees ° C.

Activating Agents, Primers or Initiators

Activating agents suitable for use in the practice of the present invention vary widely. Selection of the specific activating agent depends upon the chemistry of the polymerizable composition, the nature of cure mechanisms employed, the method and/or conditions by which the polymerization is to be effectuated, the end-use application and/or the nature of any substrate employed in the practice of the invention. The activating agents may include those involved with the polymerization of one or more polymerizable monomers, prepolymers, and/or low molecular weight polymers or oligomers, including for example, activators, co-activators, accelerators, co-accelerators, catalysts, co-catalysts, initiators and co-initiators. Of general interest for the di-activated vinyl monomers such as methylene malonates are bases, base precursors, base converters, and base enhancers. For convenience, unless otherwise stated herein, the terms "activator," "activating agent." "primer," or "initiator" is used herein to mean any and all such agents.

The required amount of activating agent may be no greater than about 2% by weight of the polymerizable composition, more preferably less than about 0.5% by weight of the polymerizable composition, and even more preferably, less than about 0.1% by weight of the polymerizable composition. In other exemplary embodiments, the desired amount of activating agent may be defined as the minimum amount necessary to achieve effective polymerization in a desired application, herein "activating amount." It is believed that the amount of activating agent required to initiate polymerization is greatly reduced as compared to known reactive systems such as epoxies, polyurethanes and the like.

Exemplary activating agents may include certain basic compounds. Such basic activating agents may initiate polymerization primarily through anionic attack. Other exemplary activating agents may initiate polymerization primarily through free radical mechanisms.

Exemplary activating agents include any material capable of speeding the rate of cure of the polymerizable compositions. In certain embodiments, the activating agents include materials capable of speeding or enabling the cure through a volume of the polymerizable composition. Exemplary activating agents include, but are not limited to, sodium or potassium acetate; acrylic, maleic or other acid salts of sodium, potassium, lithium, copper, cobalt, or other metal cations; salts such as tetrabutyl ammonium fluoride, chloride, bromide, iodide or hydroxide; or chemically basic materials such as amines and amides; or salts of polymer bound acids; benzoate salts; 2,4-pentanedionate salts; sorbate salts; or propionate salts.

Pigmented Systems

Pigments and dyes are known in the art of inks and coatings. However, due to the inherent basic nature of many of the organic colorant materials, such colorants are not readily used in anionically polymerized systems. Organic pigments and dyes, such as phthalocyanines, quinacridones, isoindolines, etc, typically contain nitrogen species often in the form of primary, secondary, or tertiary amines. These materials are often basic enough that they can initiate the polymerization of anionically polymerized materials thus rendering them unusable for pigmented systems.

On the other hand, pigments and dyes, by their very nature pose problems for UV curing by absorbing the UV energy that the photoinitiators need to initiate cure and making the cure of thicker films extremely difficult. Specialized photoinitiators are often required that are either expensive, difficult to incorporate, or both to cure highly pigmented systems.

Exemplary embodiments disclosed herein are suitable replacements for digital ink applications that required irradiation by ultraviolet light. Furthermore, the use of ultraviolet light in digital ink applications requires the use of significant printer design modifications due to the need to incorporate the ultraviolet lamps on the printhead in wide format graphic arts and industrial printers. Ultraviolet lamps need to be placed as close to the jetting of the ink as possible to initiate cure rapidly and prevent the ink from running and affecting overall print quality. Placing the ultraviolet lamps on the printheads requires a highly designed print system with a shuttle mechanism capable of moving both the print head and multiple ultraviolet lights back and forth across the print area.

Exemplary embodiments utilizing the disclosed monomers in formulated inks can lead to simpler printing systems. Ink cartridges and reservoirs that are compatible with such anionically polymerized materials can be suitable delivery systems for exemplary embodiments disclosed herein. Physical components such as tubing, connectors, pumps, additional printer equipment and the like can be designed for compatibility with exemplary formulated inks as disclosed herein.

Pigmented Formulations on Various Substrates

Pigmented formulations were applied with good results, i.e., full coverage, on the following substrates: steel, oak, PPE, PC.

ADDITIONAL EXEMPLARY EMBODIMENTS

Ink Formulation Methodology

In an alternative method for developing pigment formulations (i.e., inks), pre-polymerized DEMM (herein "pDEMM") was ground down into fine particles and then placed into a vessel containing dichloromethane at a composition of 10% by weight polymerized material. The mixture was then stirred using a magnetic stir bar for approximately 30 minutes to ensure dissolution of the material. Once the pDEMM dissolved, powdered pigment dispersions obtained from Sun Chemical, 10% by weight, were added to the formulation. The formulation was mixed further using a stir bar for an additional hour to ensure dissolution of the pigment.

Observations:

Using dichloromethane ensures very favorable dissolution. The completed formulation shows no graininess, retains color very well, and when applied to substrates, forms a lustrous colored coating that forms very quickly. The formulation can easily be applied to metal, wooden, plastic, and composite substrates.

Stability:

Because the formulation contains material that is already polymerized, its stability is dependent only on the content of the solvent, which has a high rate of evaporation. As long as the formulation is kept in an enclosed vessel when not in use, long-term stability is attainable.

Adhesion, Scratch, and Resistance Testing:

The exemplary ink compositions cure extremely quickly, but they seem to have little resistance to scratch and solvent tests. No primer is necessary to form the coating. It is believed that the inclusion of formulation additives as disclosed herein (e.g., impact modifiers, filler agents, reinforcing agents and the like) could be utilized to improved the desired properties.

Methodology:

For the crosshatch test, make an X mark with the ink formulation onto the desired substrate. Let the samples fully cure for 24 hours. Score over the X mark with a razor blade. Place a piece of scotch tape over the X mark for 1 minute, then peel of the tape quickly at an angle as close to 180° as possible.

For the solvent test, a piece of cheesecloth is folded and wrapped around the end of a ball peen hammer and secured with a rubber band. The clothed is saturated with acetone, then rubbed over the inked (coated) substrate.

Observations:

The exemplary ink by itself offers little resistance to scratching or solvents. The result of the crosshatch adhesion test was a OA. The result of the solvent resistance test was 1 rub. Again, it is believed that improved properties could be obtained by the inclusion of suitable formulation additives.

Coating Methodology:

In a first method, clear coating formulations were made using pDEMM ground particles provided as 10% by weight in dichloromethane. The mixture was then stirred using a magnetic stir bar for approximately 30 minutes to ensure dissolution of the material. Dichloromethane ensures favorable dissolution of the pDEMM. The completed formulation shows no graininess, and when it is applied to a substrate, a coating forms very quickly. The formulation can easily be applied to metal, wooden, plastic, and composite substrates, as well as on top of ink coatings. Because the formulation contains pre-polymerized material, its stability is dependent only on the content of the solvent, which has a high rate of evaporation. As long as the formulation is kept in an enclosed vessel when not in use, long-term stability is attainable.

In a second method, a "Multifunctional Blend" was utilized to develop a clear coating. Multifunctional monomers (including difunctional monomers) and polymerizable compositions are disclosed in co-pending patent application PCT/US12/60830 entitled Multifunctional Monomers, Methods For Making Multifunctional Monomers, Polymerizable Compositions And Products Formed Therefrom, incorporated herein in its entirety. In an exemplary embodiment, the multifunctional monomer is obtained by the transesterification of diethyl methylene malonate (DEMM) and 1,6-hexanediol (HD):

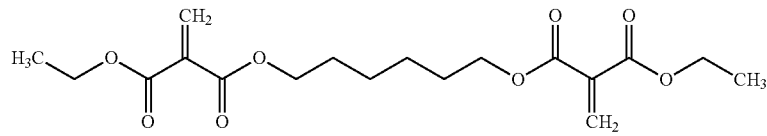 [SMILES: C=C(C(=O)OCC)C(=O)OCCCCCCOC(=O)C(=C)C(=O)OCC]

referenced herein as "Multifunctional (DEMM/HD) product".

Multifunctional (DEMM/HD) product is provided for exemplary purposes only and not by way of limitation. It is anticipated that other multifunctional methylene monomers as disclosed in the co-pending patent application can be utilized to form coatings and inks according to the principles disclosed herein.

An exemplary polymerizable composition includes: approximately 85% by weight DEMM, approximately 10% by weight Multifunctional (DEMM/HD) product, and approximately 5% by weight other (including diethyl malonate (DEM)), referenced herein as "Multifunctional Blend."

In this exemplary embodiment, an activator solution (1% by weight sodium benzoate in ethanol) was cast onto a substrate using a gauge 2.5 Meyer rod. The ethanol was permitted to flash off the surface, then using a gauge 10 Meyer rod, the Multifunctional Blend was cast on top of the treated substrate. The coating was allowed to cure at ambient temperature.

For the Multifunctional Blend, using the initiator prior to casting significantly hastens the cure speed of the coating. The resulting coating is clear and has a slightly glossy appearance. The clear coating with the Multifunctional Blend can be applied to metal, wooden, plastic, and composite substrates and may be particularly suited for use as a clear coat on top of ink coatings. Although the example discussed is a clear coating, alternate formulations can be made using coloring agents as disclosed herein.

For formulations utilizing the reactive (polymerizable/crosslinking) Multifunctional Blend, methanesulfonic acid (MSA) as a stabilizer to impart longer shelf life. It is contemplated that a variety of stabilizers could be utilized where shelf life is balanced with reactivity.

The properties of the Multifunctional Blend clear coating were explored over an ink-based undercoating to observe its protective effects as a clear coat.

Methodology:

Crosshatch and Solvent testing were completed in accordance with the methodology described above.

Observations:

The clear coating without pigment had slightly better scratch resistance compared to a similar coating prepared with pigment powders. The result of the crosshatch adhesion test was a 3A, which is in the middle of the adhesion scale. The result of the acetone solvent resistance test was 1 rub.

The coating formulated with the Multifunctional Blend and overlying the ink-based coating exhibited better properties. The result of the crosshatch adhesion test was a 4A. The result of the acetone solvent resistance test was 50 rubs before the ink coating below was affected by the solvent. These results show that the inclusion of a cross-linkable monomer positively impacts the coating performance. Exemplary embodiments include a variety of cross-linking coating formulations can be provided using multifunctional methylene malonate, methylene beta-ketoester and/or methylene beta-diketone monomers.

Some polymerizable compositions made in accordance with the principles herein may be initiated more quickly than desired for some applications. For example, it may be beneficial to slow down polymerization in order to provide higher molecular weight polymers to modify or improve certain characteristics, such as solvent resistance. The systems disclosed herein are widely tailorable in order to achieve the desired cure profile, chemical and/or physical properties.

Exemplary Coatings Used with Coupling Agents

Methodology:

An approach taken to improve the adhesion of substantially unformulated methylene malonate coatings on different metal substrates involved the use of silane coupling agents to modify the surface of the substrates. Two silane agents, aminosilane and Ken-React Lica 44, a commercially available titanate coupling agent from Kenrich Petrochemicals, Inc., were prepared in 1% by weight solutions in ethanol. These coupling agents are provided as examples only, and not by way of limiting the invention. It is believed that alternate silane or other coupling agents could be successfully utilized using the principles disclosed herein.

The coupling agent was drawn down on the steel sheet using a gauge 2.5 Meyer rod, and the solvent was allowed to flash off. Then the metal sheet was placed in a 121° C. oven for 10 minutes. The steel sheet was then removed from the oven and allowed to cool back to room temperature.

Observations of Coatings:

Two different methods were used to prepare coatings on the modified substrate. In one method, the modified surface was coated with an initiator, cast using a gauge 2.5 Meyer rod. Thereafter, the polymerizable composition (e.g., DEMM) was cast onto the surface using a gauge 10 Meyer rod. Cure was observed in less than 30 seconds.

In an alternate method, no initiator was utilized. Instead, the polymerizable composition (e.g., DEMM) was cast onto the modified substrate (silane coupling). When casting the DEMM on top of the surface only treated with the silane coupling agent, the cure was achieved over a period of 24 hours.

The coatings prepared using both the initiator and the silane coupling agent were visually clearer and smoother than those formed without the use of an initiator.

A wide variety of different initiators, as disclosed herein, could be cast down onto the silane treated surface to enhance cure time of the coating.

Adhesion, Scratch, and Resistance Testing Methodology:

The crosshatch and solvent resistant tests are described above. For the pencil hardness test, a pencil is selected from a kit and inserted into a wheeled holder. The holder is pushed across the coating. If the pencil is able to remove the coating, the test is repeated with a softer pencil. If the pencil does not remove the coating, the next harder pencil is attempted. The test continues until the hardest pencil that passes the test is found.

Observations:

Coatings were prepared on steel panels using various coupling agents and polymerizable compositions. The polymerizable compositions used were DEMM, Multifunctional Blend, Thickened DEMM (DEMM thickened with 10-12 wt % Poly(methyl methacrylate) (PMMA)), and Thickened Multifunctional Blend (Multifunctional Blend thickened with 10-12 wt % PMMA). The crosshatch, pencil hardness, and solvent resistance test results can be found in Tables 4-7.

TABLE 4

DEMM

| Coupling Agent | Crosshatch | Pencil Hardness | Solvent Resistance |
| --- | --- | --- | --- |
| 1% Aminosilane | 4A | 3H | 5 Rubs |
| 1% Lica 44 | 4A | H | 4 Rubs |
| 1% Silane and 0.1% Tetramethylguanidine | 0A | 3H | 8 Rubs |

TABLE 5

Multifunctional Blend

| Coupling Agent | Crosshatch | Pencil Hardness | Solvent Resistance |
| --- | --- | --- | --- |
| 1% Aminosilane | 1A | 3H | 40 Rubs |
| 1% Lica 44 | n/a | n/a | n/a |
| 1% Silane and 0.1% Tetramethylguanidine | 0A | 2H | 40 Rubs | n/a- indicates that the coating did not cure

TABLE 6

Thickened DEMM

| Coupling Agent | Crosshatch | Pencil Hardness | Solvent Resistance |
| --- | --- | --- | --- |
| 1% Aminosilane | 1A | 7H | 10 Rubs |
| 1% Lica 44 | 5A | 2H | 20 Rubs |
| 1% Silane and 0.1% Tetramethylguanidine | 4A | 6H | 30 Rubs |

TABLE 7

Thickened Multifunctional Blend

| Coupling Agent | Crosshatch | Pencil Hardness | Solvent Resistance |
| --- | --- | --- | --- |
| 1% Aminosilane | n/a | n/a | n/a |
| 1% Lica 44 | n/a | n/a | n/a |
| 1% Silane and 0.1% Tetramethylguanidine | 2A | 6H | 30 Rubs | n/a- indicates that the coating did not cure

Exemplary Coatings on Additional Substrates

Coatings were also explored on additional substrates: plastics and tin plate. In general, the polymerizable compositions (e.g., DEMM) applied to plastics did not require the additional use of a primer (activator) to initiate cure. Exemplary plastics include Acrylonitrile Butadiene Styrene (ABS), High Impact Polystyrene (HIPS), Polycarbonate (PC), Acrylic, and Polyethylene Terephthalate Glycol (PET-G).

The surface of the plastic initiates cure of the polymerizable composition. Samples were made using both DEMM and Thickened DEMM. Several sizes of Meyer rods were utilized to create coatings of different thicknesses. Of the sample coatings, the gauge 14 Meyer rod formed the coatings with best visual appearance, and all samples cured within 60 minutes. Visible observations are provided below:

ABS—Polymerizable composition cures seemingly clear on black surface

HIPS—Polymerizable composition cures seemingly clear on white surface

Polycarbonate—Polymerizable composition cures white and hazy

Acrylic—Polymerizable composition cures clear, wets out well on the surface

PET-G—Polymerizable composition cures with a slightly white haze

Another substrate explored was tin plate. Generally, the coatings prepared on tin plate required the use of a primer. The best adhesion was obtained using primers that contained 1,1,3,3-Tetramethylguanidine. The tetramethylguanidine primer was prepared in a solution of ethanol at a weight percent of 0.1%. The initiator was cast onto the tin using a gauge 2.5 Meyer rod, and the solvent was then allowed to flash off of the surface. Once the ethanol evaporated, the polymerizable composition (DEMM) was cast on top of the initiated surface using a gauge 10 Meyer rod. The resulting coating was clear and formed in less than 10 seconds. The coating on tin yielded a crosshatch test result of OA, a pencil hardness test result of 6H, and a solvent resistance test result of 3 rubs.

Electronics Coatings

Coatings were prepared using exemplary polymerizable compositions (e.g., DEMM 95% purity; DEMM 99% purity) and activators selected from a proprietary glucarate (0.1 wt % in water) and 0.1% sodium benzoate in ethanol.

One substrate provided for coating was an aluminum plate, cleaned with hexane. A coating was successfully obtained using 0.1% sodium benzoate in ethanol as a primer (activator).

The coating sample was subjected to a pressure cooker test (120 C, 10 psi) for one hour. Although the coating performed well, some delamination was observed. Undesired delamination can be minimized by modifying the polymerizable composition or using a surface coupling agent. Possible coupling agents include 3-aminopropyl triethoxysilane, methyl trimethoxysilane, other silanes, titanates, and the like. Coupling agents can be provided, for example, at 1 wt % in ethanol. (e.g., silane). An exemplary titanate, available from Kenrich Petrochemical, is Ken-React® LICA® 44 (neopentyl(diallyl) oxy, tri(N-ethylenediamino) ethyl titanate).

Other substrates tested include silicon wafers. Coatings were successfully achieved with the Multifunctional Blend polymerizable composition.

Exemplary polymerizable compositions were also able to adhere to (i.e., coat) the following substrates: glass, copper, silver coated copper, aluminum.

Automotive Applications

Exemplary coatings, and coated substrates can be utilized in applications as diverse as can coatings and light-weighting automotive applications. Additionally, the coatings can be particularly adapted in the automotive industry to dramatically cut energy usage and cost of running a paint shop. In the industry, up to 60 to 70% of the cost to provide an automobile is related to the paint shop due to high energy usage. The ability to coat (e.g., paint) an automobile without the need for ovens would dramatically impact the auto industry. Additionally, materials used to construct automobiles are limited by the fact that such materials must be able to survive the paint oven environment. Elimination of the heat requirement opens the door for a wider range of materials, which can directly lead to improve light-weighting. As noted above, exemplary embodiments disclosed herein may be used to coat a variety of plastic substrates. Additionally, because the exemplary embodiments disclosed herein are curable at ambient temperatures, the same paint formulation utilized by OEM automakers can be made available for the aftermarket repair shops also, which is not currently possible. Thus, exemplary embodiments disclosed herein enable automotive manufacturing wherein at least one thermally sensitive material is incorporated prior to a coating step because the thermally sensitive material will not be exposed to a paint oven as in current processes.

Currently, a typical automotive coating process includes:
a) Anti-corrosion Coat
b) Primer
c) Base Coat
d) Clear Coat.

The Base Coat may include petroleum-based solvents—40-60%; resins and binders—30-50%; colorants—5-10%; silicone polymers and other additives (catalysts, etc.)—1-2%.

The Clear Coat may include petroleum-based solvents—20-40%; resins and binders—50-70%; UV absorbers—1-2%; silicone polymers and other additives (catalysts, etc.)—1-2%; isocyanate hardener and catalyst: 0-2%.

The current coatings may be cured in a paint oven at around 320 F (160 C). Exemplary embodiments disclosed herein would eliminate the paint ovens, as well as the time required to allow the solvents to flash.

Flexible Thin Films
Methodology:

The objective of this experiment was to create a removable, thin, clear, flexible, polymeric film (coating). First, using a gauge 10 Meyer rod, and initiator was cast onto a first high density polyethylene (HDPE) sheet. The exemplary initiator was 0.67% by weight 1,1,3,3-Tetramethylguanidine in ethanol. A polymerizable composition (DEMM) was cast onto a second HDPE sheet using a gauge 14 Meyer rod. After the ethanol flashed off the first sheet, the two sheets were sandwiched together and allowed to cure for 60 seconds. After the cure time elapsed, the two HDPE sheets were separated, and the clear film was adhered to one of the two HDPE sheets. The film was separated from the HDPE sheet to which it adhered using a razor blade.

Observations of Coatings:

The film was thin, clear, and flexible, but somewhat fragile. As discussed above, the properties of the polymer film could be tailored using a faster or slower initiator. For example, a more dilute initiator could be utilized to slow polymerization to allow for the polymer to gain molecular weight. The decomposition temperature of the exemplary film (by TGA). Td5% in N2, is about 209.7° C. The Tg of the film (by DSC) is about 30.2° C.

TGA was performed using a TA Q50 TGA. TGA stands for thermal gravimetric analysis. It is a very sensitive instrument that measures how weight changes as a sample is heated. For this experiment, the sample was heated at a rate of 10 C/min to 600° C. in nitrogen until 500° C. At 500° C. the instrument switched over to air to help burn off more material. The data collected was then plotted as weight percent over temperature and the temperature at 5% mass loss was recorded. This temperature is considered the decomposition temperate (Td5%).

DSC was performed using a TA Q2000 DSC with a RCS 90 cooling system. DSC stands for differential scanning calorimetry and it measures the amount of heat it takes to raise the temperature of a reference and a sample at the same rate. Then comparing the sample and reference heat flows, the sample's phase changes by the energy released or required are observed. For this experiment, the sample was heated at 10° C./min to just below its decomposition temperature (as determined by TGA), then cooled at 20° C./min to −60° C., and then heated again to just below the decomposition temperature. The first heat is required to erase the material's thermal history and the second heat is the one used to determine thermal properties such as glass transition temperature (Tg), crystallization temperature (Tc), and melting point (Tm).

Printing Methods and Devices

Use of the ink and coating compositions disclosed herein opens up new avenues in the printing industry. The reactive ink compositions and activation mechanisms disclosed herein can be utilized to provide non-heat methods of printing and substantially 100% solids, non-solvent systems. As such, systems disclosed herein are particularly suited to replace UV-curable printing systems.

UV-curing technologies have been utilized in ink jet print heads and printing mechanisms to address a number of industrial printing needs such as marking the sheathing of wire and fiber optic cable, automotive hoses and packaging. The UV-cure technology can also be used to build layers of photopolymers for rapid prototyping. However, these systems, although advancing the general technology in the printing arts rely on expensive, complicated specialized equipment to achieve the desired results. Simplified printing mechanisms offered by the exemplary embodiments disclosed herein also greatly reduce maintenance time and capital investment.

For example, it is desired in the art to provide rapid processing, abrasion and chemical resistance, printing on irregular surfaces, in substantially 100% solvent-free (including water) systems. The exemplary embodiments disclosed herein are able to provide the desired results without the use of photo-curable materials or energy input. Thus, substrates that are not currently amenable to a UV printing process due to thermal sensitivity can be utilized with exemplary embodiments disclosed herein. For example, thermoplastic films can be printed, for example, with decorative designs, and used for can coatings and the like. Substrates such as architectural insulating sheets could be readily printed/decorated. Exemplary embodiments disclosed herein could be designed to print chemical indicators on substrates that can provide visual information about exposure to heat, light, chemicals, and the like.

Further, exemplary embodiments disclosed herein can be utilized in the consumer market as a replacement for emulsion-based ink systems that may not provide desired water or chemical resistance. Current print heads and other devices may be utilized with the exemplary ink compositions disclosed herein.

Exemplary inks as disclosed herein may be utilized with analog printing methods, including flexography, gravure, offset and screen processes. Inks provided herein offer little to no VOC solvents, nearly instantaneous cure, permit high production throughput rates, a variety of finishes dependent on the formulation additives utilized in the composition, durable abrasion and chemical resistant prints, elimination of UV equipment and thermal dryers. Additionally, the compositions disclosed herein can act as adhesives or clear coatings if desired.

Printing systems, including the reactive ink compositions, an activation mechanism, and the physical printer hardware are encompassed in this disclosure. For example, a printing system may include a cartridge of the polymerizable composition that can cure on contact with a substrate (e.g., paper) that inherently activates, or is modified to activate, the ink. In other exemplary embodiments, the printing system may include a multiple-part delivery system, disguised as a one-part system, where, for example, a first chamber holds the reactive polymerizable composition, and a second chamber holds an activator. During the printing process, the ink can contact the activator in flight or upon contact with the substrate to provide instantaneous, energy-free curing.

In other exemplary embodiments, the printing system may include an encapsulated activator carried in a polymerizable composition. The activator is thus provided in a non-engaged or inert manner. The printer may be designed to act on the encapsulated activator in some manner to make it available to the polymerizable composition to effect cure. For example, the activator may be incorporated in a wax and is released upon slight heating. In other embodiments, the encapsulated activator may be released through physical means. Thus, the polymerization activator may be present in the same ink chamber as the polymerizable composition, but prevented through physical or chemical means from initiating polymerization until predetermined activating conditions are met such as melting the encapsulating agent, breaking microspheres, changing pH to chemically activate the material, etc.

The principles disclosed herein can be utilized in three-dimensional (3d) printing operations and rapid prototyping as the printing system can be designed to provide nearly instantaneous cure of the composition to allow for facile layering and build up. On the macro level, exemplary embodiments disclosed herein can be formulated as a low melting polymer system using resins, resin blends, reactive compositions and the like. For example, low melting material can be extruded and deposited as desired and cured.

Another method of 3d printing would utilize a powder composite/resin material, that would print like ink jet, using liquid binder in specific locations. The activator would be made available as desired to activate polymerization. It is envisioned that a high molecular weight resin or resin blend incorporating the principles herein could be utilized, with reinforcing material to print objects via 3d methods.

ADDITIONAL EMBODIMENTS

Because the exemplary embodiments disclosed herein relate to a new platform of polymerizable composition that can be tailored to exhibit desired properties, the uses for such compositions is far-reaching.

Exemplary embodiments disclosed herein can be designed to provide printed substrates including inks that are chemically and thermally resistant.

Exemplary embodiments disclosed herein can provide lower viscosity than acrylic counterparts. Alternately, the viscosity can be tailored to the desired application. Compositions from 3 centipoise (cps) to 5000 cps or more, including gels, are possible. Additionally, the exemplary monomer systems disclosed herein can act like solvents, i.e., carriers, to carry desired fillers, pigments, and other formulation additives, however, the system is substantially 100% solids, i.e., the material cures without substantial release of solvents.

Exemplary embodiments provide polymerizable systems including the polymerizable composition and an activation or initiation mechanism. For example, the polymerizable composition may be anionically initiated by a basic agent. Polymerization of other exemplary embodiments may be initiated through free-radical mechanisms. In other embodiments, the activating agent may be inherent in or added to the substrate. Since the polymerizable compositions may be activated by basic substances, certain exemplary embodiments include stabilizer packages to impart mildly acidic conditions. Of course, as those with skill in the art will appreciate, there is a need to balance stability with reactivity. Certain formulation additives may acidic or basic, thus the pH of the composition needs to be considered.

Exemplary embodiments disclosed herein may be utilized as solvent-free stains to impregnate wood. Further, the polymerizable composition used as a stain can be designed to be compostable. Thus, such systems provide advantages for recycling or other environmental concerns.

Exemplary embodiments disclosed herein can be designed to be printable on food, as a label and/or decorative design.

Exemplary embodiments can be used to coat or print on fabric, e.g., woven material, fibers, non-woven, and the like.

Exemplary embodiments can be utilized to coat optical fibers. In fact, the exemplary materials can function as an optical adhesive as well as a coating.

Various activation methods may be used, including an already basic surface on the substrate to be coated (or inked). Other activation methods include the release of catalytic amounts of encapsulated bases, base precursors or base creators via energy exposure to facilitate polymerization. Other contemplated activation methods include the application of a base, base precursor, or base creator through a physical dispensation method (e.g., through a syringe, spray mechanism, and the like). Various activating methods applicable to ink and coating compositions disclosed herein are discussed in greater detail in a co-pending PCT International patent application, Serial No. PCT/US13/34636, filed Mar. 28, 2013, entitled "Methods for Activating Polymerizable Compositions, Polymerizable Systems, and Products Formed Thereby" and claiming priority to U.S. Provisional Application 61/618,147, filed Mar. 30, 2012 which is hereby incorporated by reference in its entirety.

Certain of the polymerizable compositions disclosed herein polymerize anionically and thus are not significantly impacted by the presence of air or atmospheric moisture. Instead, they may cure quickly upon contact with bases. The bases may be initially provided as base precursors or base creators and converted in some manner to an active base form. In exemplary embodiments, only catalytic amounts are required and the materials can be native, pre-applied, or applied as required. Thus an ink or coating system may include a polymerizable composition that is applied to a substrate able to initiate cure, either as an inherent property, or as modified to activate or initiate polymerization. Exemplary embodiments disclosed herein require less than about 2% by weight catalyst, or more preferably, less than about 1% by weight catalyst, to dramatically reduce leaching of non-bound chemical elements.

Exemplary embodiments disclosed herein provide means for the commercial reduction to practice of a low or zero energy input, very fast polymerizing addition polymer platform. Additionally, exemplary embodiments disclosed herein can be applied as a 100% solids reactive composition able to cure, if desired, nearly instantaneously, on contact after wetting the substrate.

Embodiments disclosed herein may eliminate the need for two part polymerization systems where complex, precise mixing and metering systems are required. Further, such ink or coating systems eliminate the need for sophisticated ovens to supply the heat necessary for full cure of prior systems. Still further, such systems eliminate the need to control volatilization of solvents. Exemplary embodiments disclosed herein provide low temperature curing allowing for the use of materials that would otherwise not survive a typical cure process in prior known systems. Exemplary embodiments disclosed herein provide ink and coating formulations that are able to replace ultraviolet light and electron beam cure systems.

Exemplary embodiments disclosed herein provide a stable pigment dispersion in a monomeric system that provide fast curing inks.

Certain exemplary embodiments disclosed herein provide crosslinkable systems. Exemplary embodiments disclosed herein are directed to systems that offer high thermal resistance without the need for elevated curing. Exemplary embodiments disclosed herein provide inked samples that possess excellent scratch and chemical resistance. Exemplary embodiments disclosed herein provide inks with high color retention. Exemplary embodiments disclosed herein include environmentally resistant coatings and inks, including water resistance.

Exemplary embodiments disclosed herein provide inks and coatings that are curable on a variety of substrates including paper, wood, metal, fibers, plastics, silicon, Acrylonitrile butadiene styrene (ABS), polycarbonate (PC), acrylics, glycol-modified polyethylene terephthalate (PETG), High Impact Polystyrene (HIPS), glass, polyimide film (e.g., Kapton®). Certain substrates are able to inherently initiate cure. Other substrates may be modified (e.g., sized or primed) to enable polymerization of the polymerizable composition.

Exemplary embodiments disclosed herein provide ink formulations suitable for use in flexographic, lithographic and offset printing. Exemplary embodiments include optional coloring agents. However, clear, i.e., colorless, inks may be formulated using the exemplary monomers, oligomers, and/or polymers disclosed herein.

Exemplary embodiments disclosed herein provide coatings for a variety of substrates.

Exemplary embodiments disclosed herein provide coated substrates, wherein the substrate is a heat sensitive material (e.g., thermoplastic).

Exemplary embodiments disclosed herein provide substrates having activating surfaces for receiving polymerizable coating compositions thereon.

Exemplary embodiments disclosed herein may be used as ambient cure digital inks. Exemplary embodiments disclosed herein provide low viscosity and rapid cure inks for digital inkjet applications for improved durability.

Exemplary embodiments disclosed herein provide coating systems applicable in a variety of coating applications, including automotive topcoats, decorative coatings, and stains.

Exemplary embodiments disclosed herein can be sourced either in whole or part from a broad sustainable resource base, including sugars, atmospheric gases, waste gases and synthesis gas.

Exemplary embodiments disclosed herein provide a new class of polymerizable ink and coating systems that can be pigmented without affecting shelf life and stability or the ability to cure easily.

Exemplary ink and coating compositions can be designed to be compostable and/or digestible. Thus, biodegradable substrates, e.g., wood, can be printed or coated with biodegradable materials.

EQUIVALENTS

Those skilled in the art will recognize, or be able to ascertain using no more than routine experimentation, many equivalents to the specific embodiments of the invention described herein. Such equivalents are intended to be encompassed by this invention.

What is claimed is:

1. A composition comprising a polymerizable composition, the polymerizable composition comprising:
    a multifunctional di-activated vinyl compound, the multifunctional di-activated vinyl compound being selected from the group consisting of methylene malonate, methylene β-ketoester, methylene β-diketone, dialkyl disubstitued vinyl, dihaloalkyl disubstituted vinyl, and combinations thereof; and
    a coloring agent; and
    wherein the polymerizable composition is curable at ambient temperature.

2. The composition according to claim 1, wherein the coloring agent comprises one or more members of the group consisting of: organic pigment, organometallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury, titanium pigment, aluminum pigment, manganese pigment, ultramarine pigment, zinc pigment, arsenic pigment, tin pigment, iron oxide pigment, antimony pigment, barium pigment, a biological pigment, dye, photochromic, conductive and liquid crystal polymer pigment, piezochromic pigment, goniochromatic pigment, silver pigment, diketopyrrolo-pyrrole, benzimidazolone, isoindoline, isoindolinone, and radio-opacifier.

3. The composition according to claim 1, wherein the polymerizable composition exhibits a shelf-life of 6 months or greater at ambient temperature.

4. The composition according to claim 1, further comprising a polymerization activator, wherein the polymerization activator is in the form of a base, a base precursor, a base converter, or base enhancer.

5. The composition according to claim 1, further comprising a formulation additive.

6. The composition according to claim 5, wherein the formulation additive comprises one or more of plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, and inert resins.

7. The composition according to claim 4, wherein the polymerization activator comprises one or more of an organic material, an inorganic material, and an organometallic material.

8. The composition according to claim 7, wherein the polymerization activator comprises one or more of: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; and salts of polyacrylic acid copolymers.

9. The composition according to claim 1, wherein the multifunctional di-activated vinyl compound comprises one or more of methylene malonate, methylene β-ketoester, and methylene β-diketone.

10. The composition according to claim 1, wherein the methylene malonate is a diethyl methylene malonate, dimethyl methylene malonate, di-n-propyl methylene malonate, di-isopropyl methylene malonate, or dibenzyl methylene malonate.

11. A composition comprising a polymerizable composition, the polymerizable composition comprising:
  a di-activated vinyl compound, the di-activated vinyl compound being selected from the group consisting of methylene malonate; and
  a coloring agent; and
  wherein the methylene malonate is a mixture of difunctional and multifunctional monomers and one or more monofunctional monomers; and
  wherein the polymerizable composition is curable at ambient temperature.

12. The composition according to claim 10, wherein the multifunctional di-activated vinyl compound is diethyl methylene malonate and the polymerizable composition further comprises the transesterification product of diethyl methylene malonate and hexane diol.

13. The composition according to claim 10, wherein the methylene malonate is a diethyl methylene malonate.

14. A composition comprising a polymerizable composition, the polymerizable composition comprising:
  a di-activated vinyl compound, the di-activated vinyl compound selected from the group consisting of a multifunctional diethyl methylene malonate; and
  a coloring agent; and
  wherein the polymerizable composition is curable at ambient temperature.

15. The composition according to claim 1, wherein the multifunctional di-activated vinyl compound comprises two or more units represented by the structure: —W—C(O)—C(=CH$_2$)—C(O)—W—, where W represents —O— or a direct bond.

* * * * *